June 18, 1957  L. W. POLLOCK  2,796,332
PROCESS FOR PRODUCTION OF CARBON BLACK
Filed May 18, 1953  2 Sheets-Sheet 1
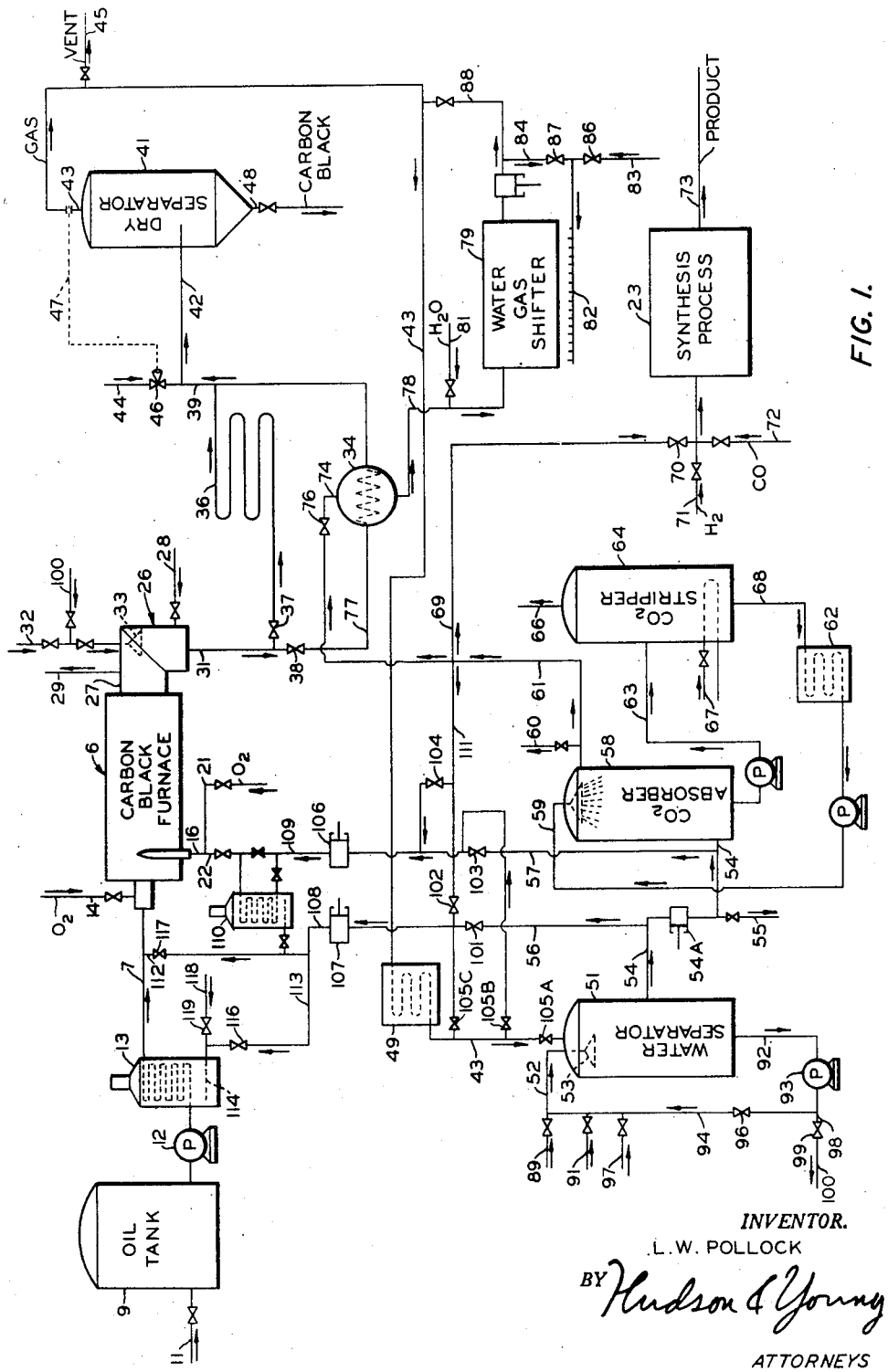
FIG. I.
INVENTOR.
L.W. POLLOCK
BY Hudson & Young
ATTORNEYS

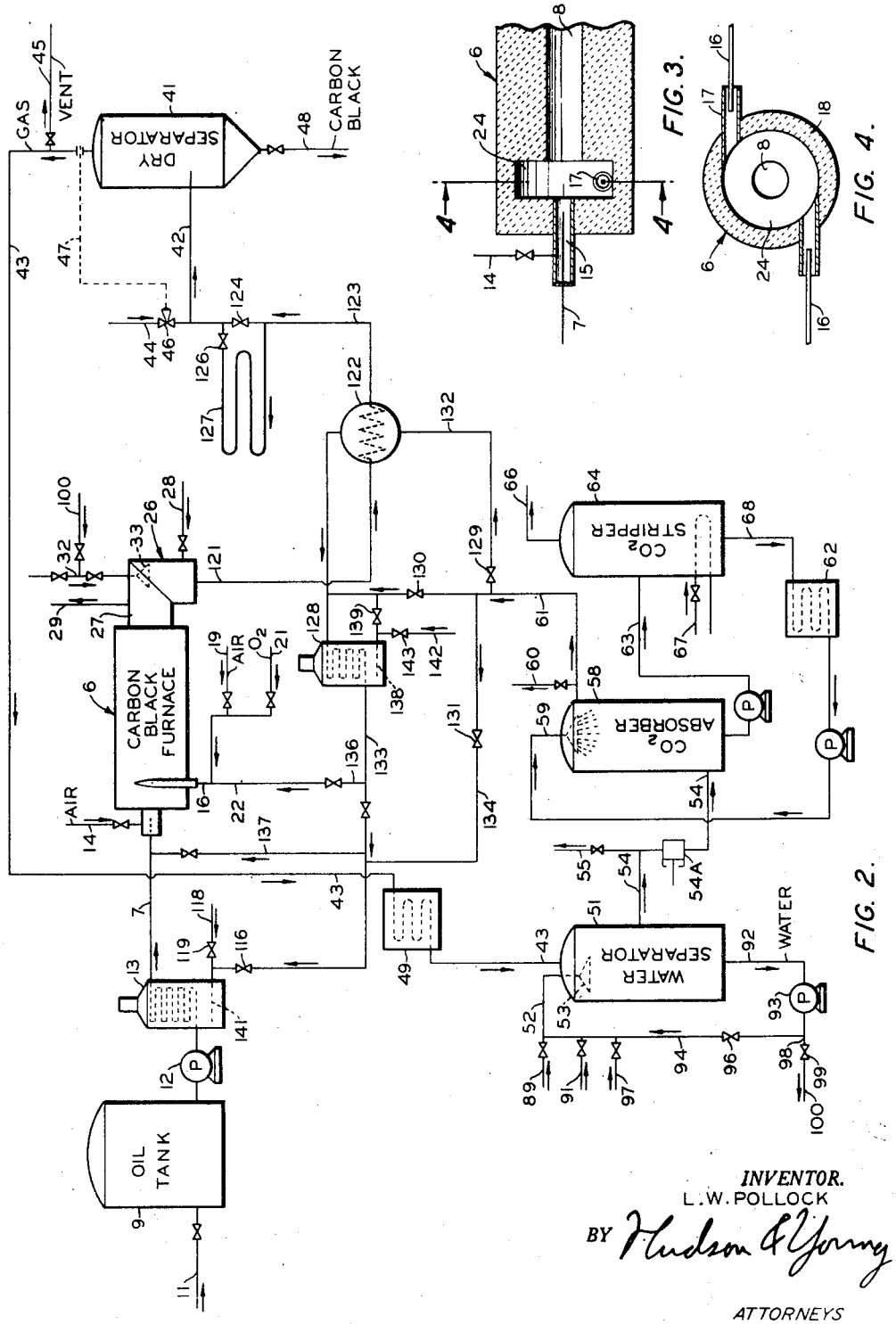

United States Patent Office 2,796,332
Patented June 18, 1957

2,796,332

PROCESS FOR PRODUCTION OF CARBON BLACK

Lyle W. Pollock, Bartlesville, Okla., assignor to Phillips Petroleum Company, a corporation of Delaware Application May 18, 1953, Serial No. 355,834

5 Claims. (Cl. 23—209.6)

This invention relates to a process for manufacturing carbon black. In one specific aspect it relates to a carbon black process in which the effluent gases are utilized instead of being dissipated into the atmosphere. In another specific aspect it relates to utilizing the effluent gases as synthesis gas in a synthesis process for the production of liquid products mainly of a hydrocarbonaceous or oxygenated hydrocarbonaceous character. In another specific aspect it relates to utilizing effluents to act as fuel increasing the thermal efficiency of the entire process and producing thereby superior carbon black in larger quantities. In another aspect it relates to means for substantially completely removing carbon black from the effluent gases, at least some of it being removed in the form of a water slurry, and then in some instances injecting a portion, or all, of said slurry into a heated portion of the cycle so as to dispose of the same and at the same time produce at least some dry carbon black therefrom. In another aspect it relates to the production of a carbon black aqueous slurry suitable for mixing with latex as the latex is coagulated forming a master batch.

The present application is a continuation-in-part of my copending application S. N. 168,989, filed June 19, 1950, now abandoned.

In the prior art of carbon black manufacture the carbon black has been removed from the smoke coming from the carbon black furnace in a rather crude manner and the effluent gases in the form of a somewhat diluted smoke have been discharged to the atmosphere to pollute the neighborhood with carbon black and discharge large volumes of gas containing valuable heating values into the atmosphere. The loss of the carbon black which contaminates the neighborhood and the loss of the gas results in a considerable economic loss aside from the nuisance created by the deposit of carbon black on surrounding property and the discharge of large volumes of fuel and combustion gases. Yet it has been impossible, prior to the present invention, to eliminate these economic losses and nuisances, because no one has been able to devise suitable means for handling the large volume of gas or smoke involved, nor has anyone prior to the present invention discovered how to substantially completely eliminate the smoke nuisance and still recover substantially all of the carbon black in a dry salable form.

One object of the present invention is to produce a carbon black process in which the effluent gases are utilized, either as fuel for the process, or as synthesis gas for the creation of valuable by-products.

Another object is to provide a process in which the fuel and thermal efficiencies are increased.

Another object is to provide a process for removing substantially all of the carbon black from the effluent gases of a carbon black furnace process, at least some of the carbon black being removed in the form of a water base slurry.

Another object is to take this slurry and use the same as a quench at a point in the process where the temperature is so high that the slurry will be dried, and the water evaporated and some dry carbon black recovered.

Another object is to reduce, or completely abate, the smoke nuisance damage to surrounding property caused by conventional separation methods.

Another object is to reduce, or completely abate, the combustion gas and fuel gas nuisance to the surrounding property resulting from ordinary carbon black operations of the prior art.

Another object is to provide suitable control steps for controlling the process described above.

Numerous other objects and advantages will be apparent to those skilled in the art upon reading the accompanying specification, drawings and claims.

In the drawings—

Figure 1 is a diagrammatic view of a carbon black producing plant embodying one preferred modification of the present invention.

Figure 2 is a diagrammatic view of a carbon black producing plant embodying a second preferred modification of the invention.

Figure 3 is an elevational cross sectional view of one type of carbon black furnace which can be used in the present invention.

Figure 4 is a cross sectional view of the furnace shown in Figure 3 taken along the line 4—4 looking in the direction indicated.

In Figure 1 carbon black is being produced in a carbon black furnace generally designated as 6. While furnace 6 can be any type of carbon black furnace in which carbon black is produced by pyrolitic action from carbonaceous materials such as hydrocarbons, it is preferable in order to obtain the best results to use a carbon black furnace in which the hydrocarbon feed 7 is introduced axially into an elongated cylindrical reaction zone 8 (see Figure 3) where it is heated by direct heat exchange with hot gas introduced tangentially. Further explanation of the preferred type of carbon black furnace and its operation will be made at an appropriate point below. The hydrocarbon entering through pipe 7 may be gas, but I prefer to use oil because the yield of carbon black is greatly increased and the quality is somewhat improved by the use of liquid hydrocarbons as the reactant feed stock. Preferably, a gas oil containing a considerable amount of cyclic and/or aromatic content is supplied to storage tank 9 through supply line 11. A suitable source is a refractory gas oil which has been recycled in a catalytic or thermal cracking step which has an API gravity of 10 to 30, at least 85% of which will vaporize at 700° F., preferably having an aniline point between 50° F. and 60° F. Oils having aniline points from 0° F. to 100° F. can be employed, but those below 50° F. become more expensive as 0° F. is approached, and from 60° F. to 100° F. the throughput and carbon black yield decreases progressively. While such an oil is very desirable to obtain best results, nevertheless any liquid or gaseous hydrocarbon which can be evaporated, sprayed or fairly well atomized and projected axially into reaction chamber 8 can be used with valuable results in the practice of the invention. Of course, if a gas is used as feed 7 it need not be heated, but if a liquid is used it will have to have been sprayed, atomized or vaporized before entering reaction zone 8. The preferred way is to pump the gas oil from oil tank 9 by pump 12 through heater 13 through pipe 7 as a superheated liquid which flashes into vapor as it passes into furnace 6 and then passes axially down the reaction chamber 8. A minor amount of air, oxygen or inert gas may be added through pipe 14 and annular space 15 in order to prevent carbon deposit around the end of hydrocarbon injecting pipe 7, but operations can proceed without any gas coming through pipe 14 with the minor disadvantage of having to clean out the furnace at intervals.

In order to supply sufficient oxygen for combustion of sufficient hydrocarbons and/or fuel gases in furnace 6 to furnish heat to pyrolitically convert carbonaceous material to carbon black in said furnace, free oxygen containing gas is injected into the furnace through pipe 16 which may be enlarged at 17 as shown in Figure 4. The wall 18 of furnace 6 is made of refractory material and the oxygen containing gas coming in pipe 16 enters the reaction zone 8 tangentially and moves circumferentially around the periphery thereof proceeding generally in a helical manner through the furnace around the axially introduced hydrocarbon through pipe 7 until mixing occurs. This tangential entry of the gases is necessary in order to obtain the best results. However, some results of value can be obtained with other types of introduction provided the mixing of the hydrocarbons and the oxygen containing gases is sufficiently turbulent and provided there is less than the stoichiometric amount of oxygen present to bind the carbonaceous material present. While air can be used as the free oxygen-containing gas in the modification shown in Figure 2 and be supplied through pipe 19 to pipe 16, in the modification shown in Figure 1, when making low nitrogen content synthesis gas it is necessary to employ oxygen entering pipe 6 from pipe 21. However, in Figure 2 air and/or oxygen may be employed from pipes 19 and 21. It is one of the features of the present invention that a gas suitable for fuel is also added through pipe 22 to pipe 16, although if desired the amount of this fuel gas can be reduced to a very low value, or completely eliminated in the modification shown in Figure 1 where the gas is more valuable in a synthesis process at 23, relying on the carbonaceous material entering through pipe 7 to supply the fuel to furnish the heat in furnace 6. In order to be able to inject large quantities of fuel and oxygen it has been found desirable to enlarge a portion of cylindrical zone 8 at 24, but this is not essential as slightly inferior but still valuable results can be obtained by using a cylindrical zone 8 of a single diameter, thus eliminating enlarged portion 24.

Large quantities of carbon black containing smoke pass out of furnace 6 into the cooling and recovery section generally designated as 26. The smoke preferably passes from furnace 6 into a water jacketed cooling section 27 which is kept from becoming red-hot by a cooling fluid, preferably water, pumped in through pipe 28 and out through pipe 29 through the usual hollow space so that 27 furnishes indirect heat exchange between smoke passing through a central passage into pipe 31 and the cooling water in said jacket.

While such cooling may suffice in some instances, in most instances it is preferred to quench the smoke and shock cool same rapidly to a temperature below that at which further reaction might take place, namely to about 1500° F. by injecting a cooling fluid, preferably water, through pipe 32 and spray head 33 directly into the smoke as a spray. Processes of value embodying the present invention can be operated, however, without said water jacketed cooling section 27 and/or spray cooling at 33.

The smoke in pipe 31 is then cooled either by useful indirect heat exchange in exchanger 34 or by indirect atmospheric cooling in heat exchanger 36 (depending on the seating of valves 37 and 38). The smoke reaches 39 at a temperature of 300 to 600° F. as desired, and can then pass into the separator 41 at such temperatures. However, it is preferred, especially due to changes in atmospheric temperature between summer and winter to regulate the temperature of the smoke entering separator 41 through pipe 42 to provide a predetermined constant temperature to the gas emerging through the pipe 43 and this may be done by adding a cooling fluid, such as water, through pipe 44 controlled by valve 46 responsive to the temperature in 43 and by means of a temperature control 47.

In order to prevent the build up of nitrogen in the system by purging the system at the start of operations, or when desired, a vent 45 is provided, which normally is closed.

While dry separator 41 is shown as a single cyclone separator, it is obvious that any other type of dry separator can be employed, such as bag filters (not shown) where the carbon black particles are filtered out of the gas, or electrical precipitators (not shown) where the gas moves between oppositely charged plates and the carbon black particles are moved by electrostatic forces to deposit on the plate and at least agglomerate sufficiently so that by passing the same through one or more sets of cyclone separators of the type 41 the agglomerated carbon black will drop out of the gas. I prefer to use in place of separator 41 a series of separators, as follows:

The smoke first passes through a Cottrell electrical precipitator where 10 to 30% of the carbon black falls out and the remainder is agglomerated sufficiently so that 60 to 80% of the remaining carbon black falls out in a primary cyclone separator and a like amount of the remaining carbon black falls out in secondary and tertiary cyclone separators, generally of progressively decreasing diameter and velocity of fluid entry (all not shown).

Gas 43 therefore has become dilute smoke with most of the carbon black removed. However, there still is enough to cause considerable economic loss and to do considerable damage as a nuisance to the surrounding property on which it constantly deposits. The carbon black is removed through line 48 for packaging, densing, pelleting or sale in any form as dry carbon black.

The gas in line 43 emerges at a temperature which may be from 250 to 500° F. and contains considerable carbon dioxide, carbon monoxide, hydrogen, water, but little nitrogen because there is a minimum of nitrogen in the process, 95% oxygen being used at 14 and 21 which contains 5% nitrogen as an impurity. By cooling the gas in indirect heat exchanger 49 the water condenses out either therein or in water separator 51. In condensing out the water tends to take some of the carbon black particles out along with it, as they may form nuclei for drop formation, but due to the generally hydrophobic nature of the carbon black some carbon black particles would remain in the gas. Substantially all of these remaining carbon black particles are removed by a water wash coming from pipe 52 through sprayhead 53. This water spray also serves to wash the water out of the gas and causes the further cooling and condensing and removal of water so that the effluent gas in pipe 54 is substantially free of carbon black and contains little water, about 6.5% water at 100° F., but contains carbon dioxide, carbon monoxide and hydrogen. It may be desirable to have a gas filter (not shown) in line 54 upstream of gas compressor 54A to keep stray carbon black out of the same. This gas can be vented, or drawn off for commercial use through vent 55, but 55 is generally closed. A portion of this gas may be supplied through pipes 56 and 57 to the heater 13 and furnace 6 as will be disclosed later, but all or most of this gas may pass through pipe 54 into $CO_2$ absorbers 58 where the $CO_2$ is removed by a suitable spray liquid entering through pipe 59. A vent 60 similar to, and for the same purposes as vent 55, may be provided. The effluent gas in 61 from the absorber 58 is substantially free from $CO_2$.

$CO_2$ absorption system preferably employs an aqueous alkaline wash fluid 59 comprising water and diethanolamine, or water and potassium hydroxide, which solution is cooled in cooler 62, absorbs $CO_2$ in absorber 58, carrying the $CO_2$ in solution through pipe 63 into a conventional stripper 64 where the $CO_2$ is driven off through pipe 66 because of heat added through pipe 67, stripped liquid then passing through pipe 68 to cooler 62 completing the cycle.

The effluent gas in 61 is suitable for use as fuel or as a synthesis gas for the production of normally liquid or gaseous hydrocarbonaceous and oxygenated hydrocarbonaceous materials and a large portion, or all of the same, may be passed through pipe 69, depending on the position of valve 70 into a synthesis process 23.

Synthesis process 23 may be any suitable synthesis process in which a gas comprising essentially carbon monoxide and hydrogen is contacted with a suitable synthesis catalyst under suitable temperature and pressure conditions to produce normally liquid or gaseous synthesis products, such as the "Fischer Tropsch" or other synthesis processes known to the prior art. In many of these processes it is desirable to have a hydrogen to carbon monoxide ratio of about 2 and to use a pressure of about 500 pounds per square inch and a temperature of about 200° F. in the presence of a catalyst consisting of iron oxide or other iron-containing-material such as mill-scale or the like. As the synthesis process may be any used in the prior art and as I am not the inventor of such process per se, it is not believed necessary to describe the process further. However, such processes are often quite critical as to the ratio of gases employed, and as the present invention may produce considerable variation in the hydrogen to carbon monoxide ratio, it is desirable to adjust this ratio when employing such critical process by adding hydrogen through pipe 71 or carbon monoxide through pipe 72. For example, if the gas in pipe 69 has a ratio of $H_2$ to CO of about 1.6, sufficient hydrogen can be added to bring this ratio to exactly 2 if desired or if necessary.

The products of the process 23 are removed through pipe 73.

An alternate method of adjusting this ratio is by taking part of the gas from 61 through pipe 74 controlled by valve 76 and passing the same in indirect heat exchange with the hot smoke in pipe 77 in heat exchanger 34 (provided valve 38 is open and valve 37 closed). The heated synthesis gas emerges from exchanger 34 through pipe 78 and passes through a water gas shifter 79, water, or stream being added in pipe 81 in the desired amount. The water gas shifter 79 is a catalytic shift converter well known in the art to effect the reaction

$$CO + H_2O \rightarrow CO_2 + H_2$$

so further description of the same is unnecessary. When no heat is received at 34, or not enough heat, from pipe 77, heat can be furnished to the shifter 79 by burner 82 supplied with fuel from a suitable source 83 and/or a fuel gas line 84 depending on the position of valves 86 and 87. The synthesis gas with an increased amount of hydrogen and decreased amount of carbon monoxide in pipe 88 is recycled to line 43 to remove the carbon dioxide and such amount of water as may be present because of an incomplete reaction, and thereby builds up the hydrogen ratio in line 69 to the amount desired for the sythesis process 23.

Returning to water separator 51, the water in pipe 52 will absorb considerably more carbon black if it is provided with a small but effective amount of suitable wetting agent added into pipe 89. Considerable latitude is allowed in the selection of this wetting agent, certain rubber companies preferring different agents for this purpose. "Daxad 11" is quite effective and is a condensation product of formaldehyde and naphthalene sulfonic acids. Sodium lignin sulfate is valuable and is known as "Marasperse." Usually about .5 to 3% of "Marasperse" plus .2 to .4% caustic based on the weight of the carbon black is employed in order to get maximum results but considerably less can be used with some valuable results. "Marasperse" is preferred by most rubber companies at present, largely because the pH range over which it precipitates the carbon black from the aqueous slurry corresponds fairly closely to the pH range over which the natural rubber latex, or other rubbery polymers latex is coagulated, and therefore both the latex and the carbon black can be compounded together simultaneously in the formation of mixtures of rubber or rubbery polymeric materials containing carbon black, especially in the production of so-called "master batches." In some instances it is also valuable to add a small but effective amount of a foam reducing agent through pipe 91. Any foam reducing agent known to the prior art may be employed such as tetrachloroethylene or Turkey red oil.

I have found that when the water 52 also contains a favorable amount of carbon black, the amount depending upon the type of carbon black, that it is more absorbent of further carbon black than if it were free from carbon black. The preferred concentration of the carbon black in the recycled liquid 52 is from .5 to 3% by weight of the water if a wetting agent is used, but operations without any wetting agent are still of commercial value. The liquid containing the carbon black and the water from water separator 51 passes out through pipe 92 and is recirculated by pump 93 through recycle pipe 94 controlled by valve 96. Considerable water is picked up from gas 43 so no further water generally need be added. However, additional water can be added through pipe 97 if desired. A portion of the recycle liquid can be removed through line 98 controlled by valve 99. This material is in the form of a slurry which could be used to mix with latex of rubber or rubbery polymeric materials, such as the various synthetic rubbers made from butadiene and/or styrene, or the like in the production of master batches. However, it is preferred to produce the carbon black as a dry product and therefore the liquid in the pipe 98 is preferably recycled through line 100 (which appears at both the lower left corner and the upper center of Figures 1 and 2, the part of line 100 connecting these two parts being shown broken away in the drawing to simplify the same) and injected into the quench water coming in through pipe 32 into the cooling section 27 of furnace 6 where the water is rapidly evaporated. It is uncertain whether all of the carbon black remains carbon black, but if the temperature of reaction is rapidly passed it is believed that most of the carbon black in the slurry 98 is dried and recovered as dry carbon black in pipe 48 or dry separator 41, except for the small amount that inevitably travels on through pipe 43 and is picked up in separator 51 by separator 53 and recycled eventually through pipe 98.

While a portion, or all, of the gas passing through pipes 54 or 61 can be used in synthesis process 23 a certain proportion of these gases, or in some instances all of these gases, can be used in the carbon black furnace 6 and heater 13 by a suitable adjustment of valves 101, 102, 103 and 104, compressors 106 and 107 providing the necessary pressure. Note that valve 105A is open and valves 105B and 105C are closed. By closing valves 101, 102, 103 and 104 and partly closing valve 105A, while opening valves 105B and 105C, a more direct recycle is accomplished with partial water removal by cooling in cooler 49 to 100° F., for example, but with no removal of $CO_2$ from the gas in lines 108 and 109.

Even the effluent gas in pipe 31 has heating value as a fuel, because it contains considerable carbon monoxide and hydrogen. Therefore after the water has been removed in separator 51 the gas in lines 56 and 57 has a higher heating value with respect to its volume because of the removal of the water. Furthermore, the gas in line 61 which has had its carbon dioxide removed to a great extent in absorber 58 has still greater heating value, in fact so much heating value that when added with oxygen from line 21 in line 16 it may produce a hotter flame than desirable, in which case it is advantageous to temper the same with an admixture of carbon dioxide containing gas from line 57 or to substitute entirely the gas from line 57 in line 21. By opening valve 101 gas from line 56 will enter line 108, and similarly opening valve 103 will allow gas from line 57 to enter line 109, while gas from line 61 passing through pipe 111 can enter line 108 through valve 102 or line 109 through valve 104. The gas in line 109 can be preheated by being bypassed through furnace 110, and I have found such preheating is of value in the practice of my invention, though not essential thereto.

The gas in line 109 coming from line 57 or line 111 is used as fuel in the carbon black furnace while gas from line 108 coming from line 56 or line 111 can be passed through line 112 to be used as a portion of the reactants in the process, or can be passed through line 113 to act as fuel for heater 114 to heat the heater 13 depending on the position of valves 116 and 117. Furthermore, fuel gas from any source can be supplied through line 118 to burner 114 by adjusting valve 119.

Figure 2 is much the same in its general arrangement as Figure 1 and, therefore, the description of the same will be made as short as possible. All reference numerals from 6 to 100, and 116 to 119, inclusive, represent a corresponding part having exactly the same function as the part with the same reference numeral in Figure 1, so no further description of these parts is necessary relative to Figure 2. When air is used in Figure 2, it is essential to bleed some gas off through one or more of vents 45, 55 and 60 to avoid nitrogen build up. If vented to the atmosphere, vent 45 is least expensive, but the gases from 55 or 60 are of more commercial value.

In Figure 2 the carbon black smoke emerges from the quenching section 27 of carbon black furnace 6 through pipe 121 and passes in indirect heat exchange through heat exchanger 122 into pipe 123 and from there through pipe 42 into separator 41. If desired valve 124 may be closed and valve 126 opened, thereby further cooling the gas from pipe 123 by making it pass through an indirect heat exchange with the atmosphere in pipe 127 before reaching pipe 42.

The atmospheric cooler 127 may be used for heat control, or may be omitted, but is useful in starting up the process before heat exchanger 122 becomes steady in operation.

The gas coming through pipe 61 in Figure 2 is the same as in the correspondingly numbered pipe in Figure 1 and comprises essentially carbon monoxide and hydrogen. As such it is a valuable fuel for use in the process of furnace 6, for use in heating the heater 13, or, as it contains combined carbon, it can be used as reactant carbonaceous material by adding the same to the hydrocarbons in pipe 7.

It is desirable to heat this gas 61 up before using it in some of these purposes and this can be done either in heat exchanger 122 and/or in heater 128 by a suitable manipulation of valves 129, 130 and 131. Depending upon the position of these valves the gas passes through lines 132, 133 and/or 134 and through pipes 136 and 137 to furnace 6. At the same time this gas can be used as fuel in burner 138 of furnace 128 by opening valve 139 and in burner 141 of furnace 13 by opening valve 116. At the same time fuel from another source can be used through pipe 142 controlled by valve 143 or pipe 118 controlled by valve 119 to supplement or replace the gas from pipe 61.

EXAMPLE

The following example illustrates one preferred method of operating the system shown in Figure 1, wherein the tangential fuel for the carbon black furnace 6 is supplied by a portion of the gas in line 61, recycled through lines 111, 109 and 16. This recycle gas is preheated in furnace 110 to a temperature of 800° F. and introduced into furnace 6 at a rate of 20 s. c. f. per minute together with oxygen from line 21 at a rate of 170 s. c. f. per minute. The fuel supplied to the furnace via line 7 is an oil having an aniline point of 50° F., and an API gravity of 18°; it is fed into furnace 6 at a rate of 25 lbs. per minute. Under these conditions the temperature in furnace 6 is 2700° F. The reaction products leaving furnace 6 comprise carbon black (57 lbs. per 100 lbs. of oil feed) and an off-gas stream (715 s. c. f. per min.) having the following composition in volume percent:

Table I

| Chemical Formula of Gas | Volume Percent | |
|---|---|---|
| | In Present Example | Preferred Range |
| $H_2$ | 46.8 | 50–40 |
| $CO$ | 28.5 | 27–35 |
| $CO_2$ | 3.2 | 3– 4 |
| $CH_4$ | 1.8 | 1– 2 |
| $C_2H_2$ | 0.8 | 1– 2 |
| $N_2$ | 1.3 | 1– 2 |
| $H_2O$ | 16.6 | 15–18 |

Better results are obtained within the preferred range of volume percent listed in the table.

After the quenching and carbon black removal steps this gas stream is passed via line 43 to water separator 51 and thence to $CO_2$ absorber 58, for the removal of water and $CO_2$. The gas leaving absorber 58 has the following composition in volume percent:

Table II

| Chemical Formula of Gas | Volume Percent | |
|---|---|---|
| | In Present Example | Preferred Range |
| $H_2$ | 54.6 | 59–46 |
| $CO$ | 33.2 | 31–41 |
| $CO_2$ | 0 | 0–1 |
| $CH_4$ | 2.1 | 1.1–2.4 |
| $C_2H_2$ | 2.1 | 1.1–2.4 |
| $N_2$ | 1.5 | 1.1–2.4 |
| $H_2O$ | 6.5 | 5–6 |

Better results are obtained within the preferred range of volume percent listed in the table, the amount of $CO_2$ being critical to its use as a rich combustible gas, and very critical to its use as an $H_2$, $CO$ gas for use in synthesis processes for forming liquid products by reaction over a catalyst.

The heating value of the off gas is 348 B. t. u. per s. c. f. (dry basis) and the net production of this gas, after the removal of the recycle stream via line 111, is 579 s. c. f. per minute (dry basis).

It will be noted that the composition of the off gas stream (Table II) is such that it is suitable as a feed to Fischer-Tropsch type synthesis processes. Hence this entire stream may be passed to synthesis zone 23 if desired. Alternatively, a portion of the gas may be passed through water gas shifter 79, in order to increase the proportion of $H_2$ to $CO$ in the synthesis gas feed, or hydrogen from an extraneous source may be added via line 71 for the same purpose.

A number of advantages are to be noted for the above described method of operation. The removal of the $CO_2$ and water from the off gas stream materially increases the heating value of this gas, both as compared with the untreated gas and as compared with the off gas produced in a similar process in which the recycled gas is not treated for removal of $CO_2$ and water. The net production of off gas, i. e. the gas available as feed for a synthesis process or for use as fuel, is increased, and a higher yield of carbon black is obtained per pound of oil feed because of the fuel value of the recycle gas.

While I have shown in the drawings and described in the specification certain preferred examples and embodiments of my invention, the invention obviously is not limited thereto but they are merely given for purposes of illustration, and the scope of the invention is set forth in the following claims.

Having described my invention, I claim:

1. In a combined carbon black and synthesis gas producing process in which a feed consisting essentially of hydrocarbons, oxygen, and recycled synthesis gas hereinafter described undergoes partial combustion in a carbon black furnace, and the resultant effluent smoke containing carbon black and combustion gas is treated to separate out the carbon black from said combustion gas, the improvement comprising cooling said separated combustion gas below its dew point, washing said separated combustion gas with water to remove some of its water content, removing the carbon dioxide from the effluent gas from said washing step to form a synthesis gas, withdrawing a first portion of said synthesis gas as a product, recycling a second portion of said synthesis gas to said feed as above described, and increasing the hydrogen to carbon monoxide ratio in said synthesis gas by recycling a third portion of said synthesis gas to a point in the process upstream of said washing step and contacting said third portion of said synthesis gas in said last recycle with water under temperature and pressure effective to cause a water gas shift increasing the hydrogen at the expense of converting some carbon monoxide to carbon dioxide, whereby the carbon dioxide produced therein is removed in said carbon dioxide removal step upstream of the point where said first portion of said synthesis gas is withdrawn as a product.

2. In a combined carbon black and synthesis gas producing process in which a feed consisting essentially of hydrocarbons, oxygen, and recycled synthesis gas hereinafter described undergoes partial combustion in a carbon black furnace, and the resultant effluent smoke containing carbon black and combustion gas is treated to separate out the carbon black from said combustion gas, the improvement comprising washing said separated combustion gas with water to remove some of its water content, removing the carbon dioxide from the effluent gas from said washing step to form a synthesis gas, withdrawing a first portion of said synthesis gas as a product, recycling a second portion of said synthesis gas to said feed as above described, and increasing the hydrogen to carbon monoxide ratio in said synthesis gas by recycling a third portion of said synthesis gas to a point in the process upstream of said washing step and contacting said third portion of said synthesis gas in said last recycle with water under temperature and pressure effective to cause a water gas shift increasing the hydrogen at the expense of converting some carbon monoxide to carbon dioxide, whereby the carbon dioxide produced therein is removed in said carbon dioxide removal step upstream of the point where said first portion of said synthesis gas is withdrawn as a product.

3. In a combined carbon black and synthesis gas producing process in which a feed consisting essentially of hydrocarbons, oxygen, and recycled synthesis gas hereinafter described undergoes partial combustion in a carbon black furnace, and the resultant effluent smoke containing carbon black and combustion gas is treated to separate out the carbon black from said combustion gas, the improvement comprising washing said separated combustion gas with a liquid carbon dioxide absorbent reagent to remove the carbon dioxide to form a synthesis gas, withdrawing a first portion of said synthesis gas as a product, recycling a second portion of said synthesis gas to said feed as above described, and increasing the hydrogen to carbon monoxide ratio in said synthesis gas by recycling a third portion of said synthesis gas to a point in the process upstream of said washing step and contacting said third portion of said synthesis gas in said last recycle with water under temperature and pressure effective to cause a water gas shift increasing the hydrogen at the expense of converting some carbon monoxide to carbon dioxide, whereby the carbon dioxide produced therein is removed in said washing step upstream of the point where said first portion of said synthesis gas is withdrawn as a product.

4. The process of claim 3 in which at least some of the heat for the water gas shift is provided by burning some of said synthesis gas.

5. The process of claim 3 in which at least some of the heat for the water gas shift is provided by indirect heat exchange between said third portion of said synthesis gas and said effluent smoke from said furnace.

References Cited in the file of this patent
UNITED STATES PATENTS

| | | |
|---|---|---|
| 1,520,115 | Brownlee et al. | Dec. 23, 1924 |
| 2,106,137 | Reed | Jan. 18, 1938 |
| 2,241,674 | Mohr et al. | May 13, 1941 |
| 2,564,736 | Stokes | Aug. 21, 1951 |
| 2,585,659 | Kilpatrick | Feb. 12, 1952 |
| 2,587,107 | Cade | Feb. 26, 1952 |
| 2,605,174 | Krejci | July 29, 1952 |
| 2,668,754 | Lichtenfels | Feb. 9, 1954 |